United States Patent
Sodeoka

(10) Patent No.: US 8,742,638 B1
(45) Date of Patent: Jun. 3, 2014

(54) HYDRODYNAMIC BEARING ASSEMBLY AND SPINDLE MOTOR HAVING THE SAME

(71) Applicant: Samsung Electro-Mechanics Co., Ltd., Suwon (KR)

(72) Inventor: Satoru Sodeoka, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/793,634

(22) Filed: Mar. 11, 2013

(30) Foreign Application Priority Data

Dec. 26, 2012 (KR) .................. 10-2012-0153004

(51) Int. Cl.
*H02K 5/16* (2006.01)

(52) U.S. Cl.
USPC .......................................... 310/90; 310/67 R

(58) Field of Classification Search
USPC .................................. 310/67 R, 90
See application file for complete search history.

(56) References Cited

U.S. PATENT DOCUMENTS

| | | | |
|---|---|---|---|
| 6,271,612 B1 * | 8/2001 | Tanaka et al. ................. | 310/90 |
| 6,914,358 B2 * | 7/2005 | Tokunaga et al. .............. | 310/90 |
| 7,466,050 B2 * | 12/2008 | Kuyama et al. ................ | 310/90 |
| 7,527,432 B2 * | 5/2009 | Asada et al. .................. | 384/107 |
| 2003/0230943 A1 * | 12/2003 | Tokunaga et al. ............. | 310/90 |
| 2005/0025405 A1 | 2/2005 | Tamaoka | |
| 2008/0112306 A1 * | 5/2008 | Hirata et al. .................. | 369/269 |
| 2011/0200279 A1 | 8/2011 | Goto | |
| 2012/0288223 A1 | 11/2012 | Yu | |
| 2014/0009020 A1 * | 1/2014 | Kwon et al. ................... | 310/90 |

FOREIGN PATENT DOCUMENTS

| | | |
|---|---|---|
| JP | 2002-310144 | 10/2002 |
| JP | 2004-11704 | 1/2004 |
| JP | 2004-132535 | 4/2004 |
| JP | 2005-48890 | 2/2005 |
| JP | 2005-321005 | 11/2005 |
| JP | 2006-38211 | 2/2006 |
| JP | 2006-275077 | 10/2006 |
| JP | 2006-283906 | 10/2006 |
| JP | 2007-16849 | 1/2007 |
| JP | 2007-107555 | 4/2007 |
| JP | 2008-64302 | 3/2008 |
| JP | 2011-163502 | 8/2011 |
| KR | 10-2012-0125735 | 11/2012 |

OTHER PUBLICATIONS

Japanese Office Action mailed Dec. 24, 2013 in corresponding Japanese Application No. 2013-042918.
Korean Office Action mailed Jan. 10, 2014 in corresponding Korean Application No. 10-2012-0153004.

* cited by examiner

*Primary Examiner* — Thanh Lam

(57) ABSTRACT

There is provided a hydrodynamic bearing assembly including a sleeve; and a shaft rotatably inserted into a shaft hole and constituting a bearing clearance, wherein at least one of an inner circumferential surface of the sleeve and an outer circumferential surface of the shaft includes upper and lower radial dynamic pressure grooves having a herringbone pattern, and conditional expressions $a+b>c+d$ and $b-a>c-d>0$ are satisfied.

12 Claims, 4 Drawing Sheets

HYDRODYNAMIC BEARING ASSEMBLY AND SPINDLE MOTOR HAVING THE SAME

CROSS-REFERENCE TO RELATED APPLICATIONS

This application claims the priority of Korean Patent Application No. 10-2012-0153004 filed on Dec. 26, 2012, in the Korean Intellectual Property Office, the disclosure of which is incorporated herein by reference.

BACKGROUND OF THE INVENTION

1. Field of the Invention

The present invention relates to a hydrodynamic bearing assembly and a spindle motor having the same.

2. Description of the Related Art

In general, a small spindle motor used in a recording disk driving device (e.g., a hard disk drive (HDD)) includes a hydrodynamic bearing assembly. A lubricating fluid such as oil is filled in a bearing clearance of the hydrodynamic bearing assembly. The oil filled in the bearing clearance is pumped by a dynamic pressure groove to form hydrodynamic pressure to rotatably support a shaft.

During rotation and driving of a rotor, bubbles can be formed in the lubricating fluid filled in the bearing clearance. A circulation hole may be formed in a sleeve in order to discharge the bubbles from the lubricating fluid.

That is, the bubbles may be discharged from lubricating fluid filled in the bearing clearance outwardly through the circulation hole.

However, lubricating fluid may not circulate, and that is, may not move due to process tolerance or assembly tolerance of a sleeve or shaft.

Thus, bubbles may not be discharged outwardly from a bearing clearance.

RELATED ART DOCUMENT

Japanese Patent Laid-Open Publication No. 2008-064302

SUMMARY OF THE INVENTION

An aspect of the present invention provides a hydrodynamic bearing assembly capable of reducing occurrence of a phenomenon in which lubricating fluid does not circulate during at the time of initial rotation, and a spindle motor having the same.

According to an aspect of the present invention, there is provided a hydrodynamic bearing assembly including a sleeve including a shaft hole formed therein, and a shaft rotatably inserted into the shaft hole, the shaft constituting, together with the sleeve, a bearing clearance filled with lubricating fluid, wherein at least one of an inner circumferential surface of the sleeve and an outer circumferential surface of the shaft includes upper and lower radial dynamic pressure grooves having a herringbone pattern formed therein so as to pump the lubricating fluid filled in the bearing clearance, and when an axial direction distance from an upper end of the upper radial dynamic pressure groove to a highest pressure portion is 'a', an axial direction distance from a lower end of the upper radial dynamic pressure groove to the highest pressure portion is 'b', an axial direction distance from an upper end of the lower radial dynamic pressure groove to a highest pressure portion is 'c', and an axial direction distance from a lower end of the lower radial dynamic pressure groove to the highest pressure portion is 'd', conditional expressions a+b>c+d and b−a>c−d>0 are satisfied.

The hydrodynamic bearing assembly may further include a sleeve housing including the sleeve inserted thereinto.

The hydrodynamic bearing assembly may further include a communication groove formed on the outer circumferential surface of the sleeve to provide a circulation path for the lubricating fluid, and a communication hole formed in the sleeve to connect the communication groove and the shaft hole in the sleeve.

The communication groove may include a first communication groove formed in an axial direction and connected to the communication hole, and a second communication groove connected to the first communication groove and formed in a diameter direction.

The sleeve housing may include a plate portion having a circular plate shape and a cylindrical wall portion extending from the plate portion in an axial direction.

The hydrodynamic bearing assembly may further include a flange portion formed at an upper end portion of the sleeve and coupled to an upper surface of the cylindrical wall portion.

The hydrodynamic bearing assembly may further include a rotor hub fixedly installed on an upper end portion of the shaft and including a protrusion wall portion protruding to form a liquid vapor interface together with the cylindrical wall portion, and the cylindrical wall portion may have an outer circumferential surface having an upper end portion inclined towards the protrusion wall portion.

The hydrodynamic bearing assembly may further include a flange member fixedly installed on the shaft to be disposed below the sleeve and rotating together with the shaft.

According to another aspect of the present invention, there is provided a spindle motor including a base member including an installation portion protruding in an axial direction, a sleeve housing fixedly installed on an inner surface of the installation portion, a sleeve inserted and fixeldy installed in the sleeve housing and including a shaft hole formed therein, a shaft rotatably inserted into the shaft hole, a flange member fixedly installed on the shaft to be disposed below the sleeve and rotating together with the shaft, and a rotor hub fixedly installed on an upper end portion of the shaft and including a protrusion wall portion protruding to form a liquid vapor interface together with an outer circumferential surface of the sleeve housing, wherein at least one of an inner circumferential surface of the sleeve and an outer circumferential surface of the shaft includes upper and lower radial dynamic pressure grooves having a herringbone pattern formed therein so as to pump lubricating fluid filled in the bearing clearance, and when an axial direction distance from an upper end of the upper radial dynamic pressure groove to a highest pressure portion is 'a', an axial direction distance from a lower end of the upper radial dynamic pressure groove to the highest pressure portion is 'b', an axial direction distance from an upper end of the lower radial dynamic pressure groove to a highest pressure portion is 'c', and an axial direction distance from a lower end of the lower radial dynamic pressure groove to the highest pressure portion is 'd', conditional expressions a+b>c+d and b−a>c−d>0 are satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
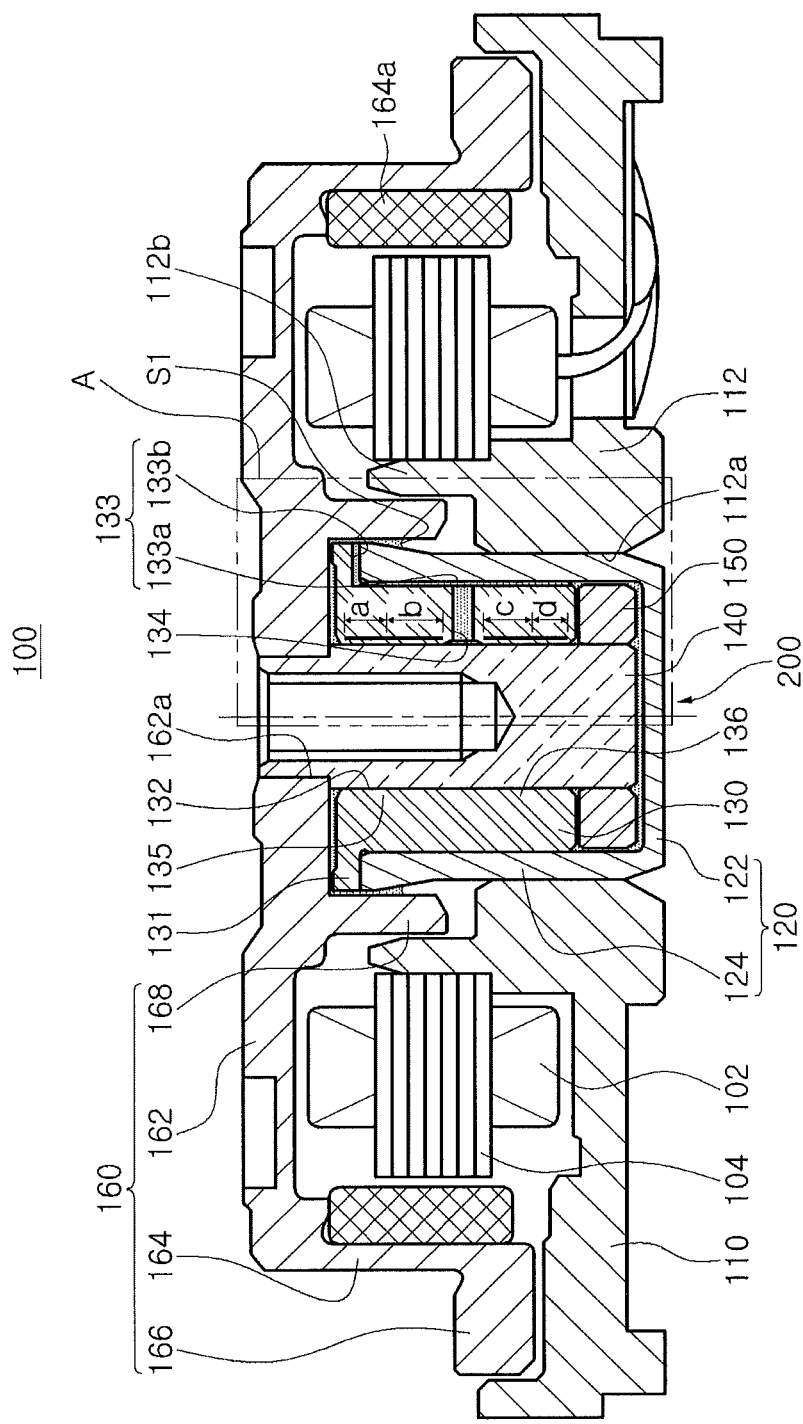
FIG. 1 is a schematic cross-sectional view of a spindle motor including a hydrodynamic bearing assembly according to an embodiment of the present invention.
Figure 2:
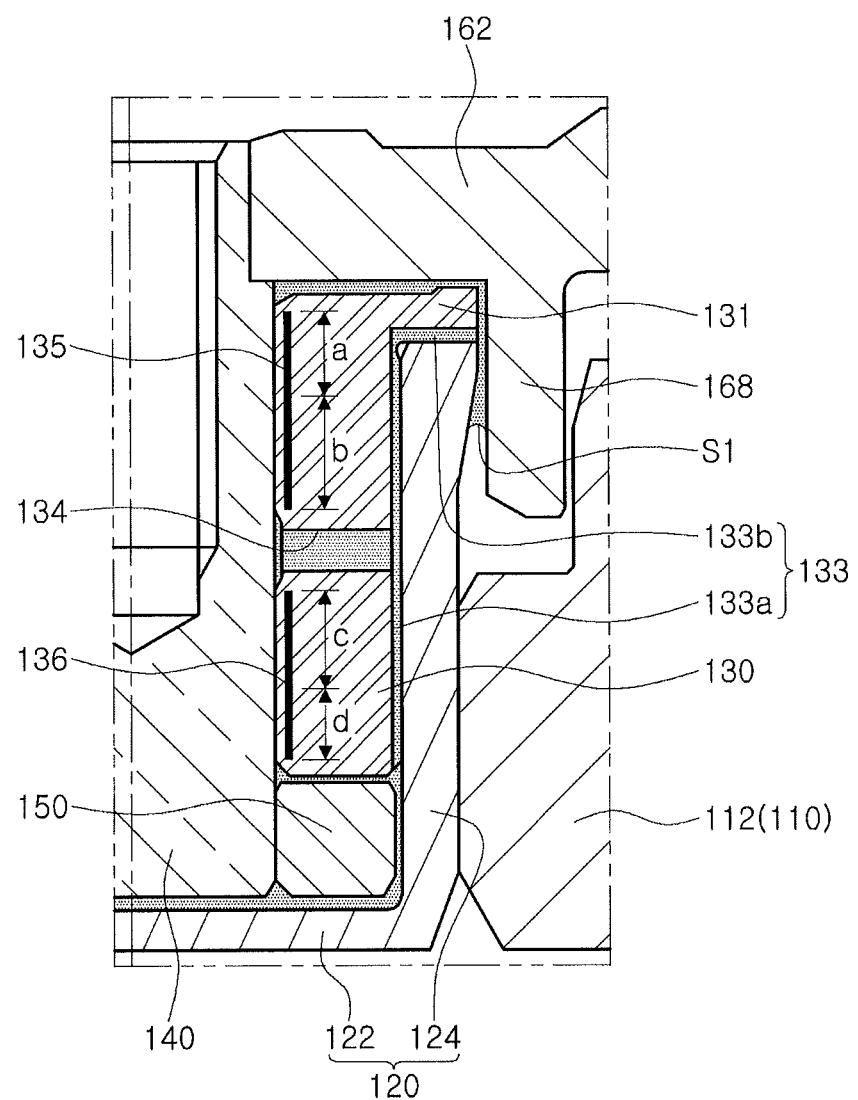
FIG. 2 is an enlarged diagram of portion A of FIG. 1.
Figure 3:
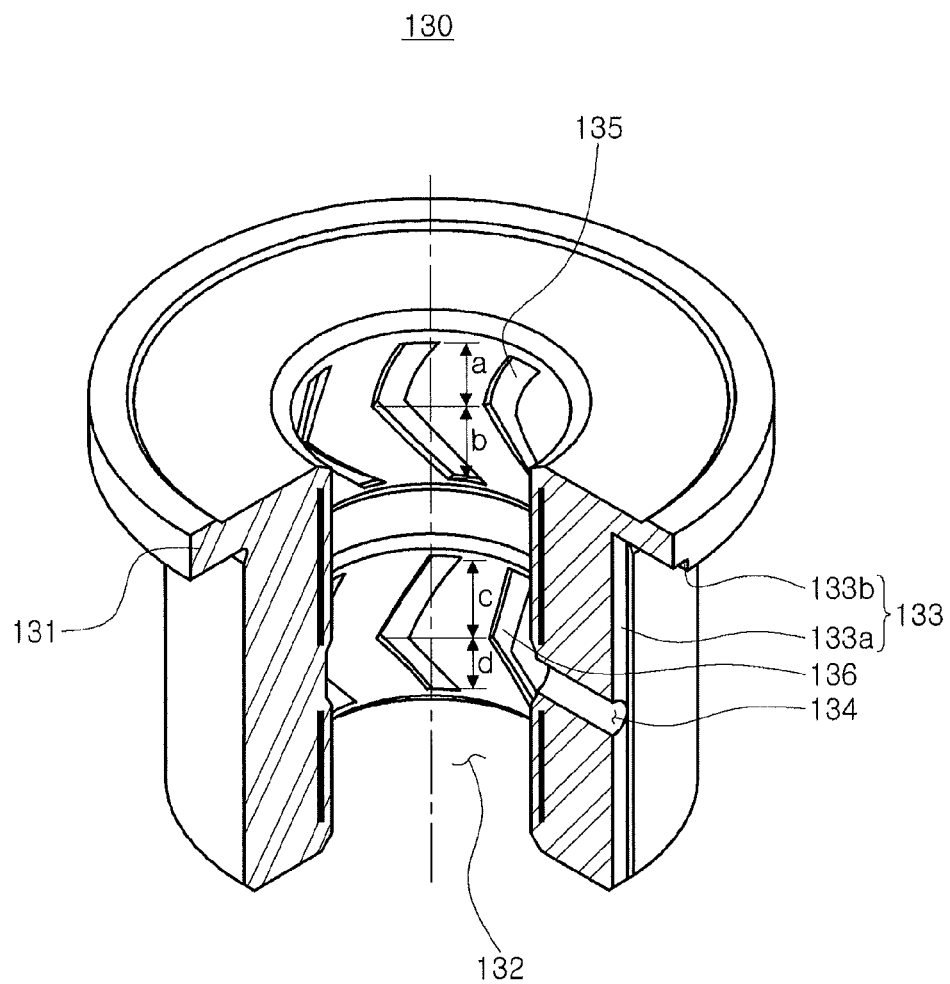
FIG. 3 is a partially exploded perspective view of a sleeve included in a spindle motor including a hydrodynamic bearing assembly according to an embodiment of the present invention.
Figure 4:
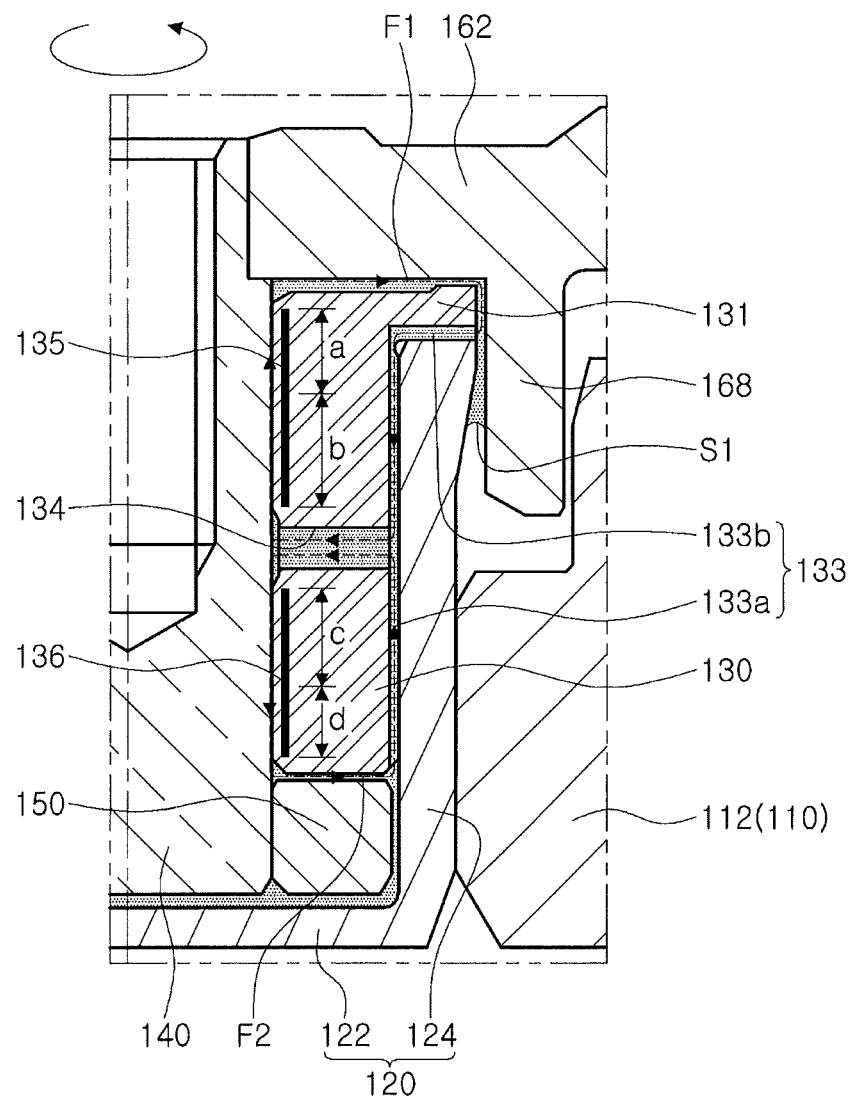
FIG. 4 is a diagram for explaining a flow path of lubricating fluid in a bearing clearance formed in a hydrodynamic bearing assembly according to an embodiment of the present invention.

FIG. 1 is a schematic cross-sectional view of a spindle motor 100 including a hydrodynamic bearing assembly 200 according to an embodiment of the present invention, FIG. 2 is an enlarged diagram of portion A of FIG. 1, FIG. 3 is a partially exploded perspective view of a sleeve 130 included in the spindle motor 100 including the hydrodynamic bearing assembly 200 according to an embodiment of the present invention, and FIG. 4 is a diagram for explaining a flow path of lubricating fluid in a bearing clearance formed in the hydrodynamic bearing assembly 200 according to an embodiment of the present invention.

Referring to FIGS. 1 through 4, the spindle motor 100 according to the embodiment of the present invention may include a base member 110, a sleeve housing 120, the sleeve 130, a shaft 140, a flange member 150, and a rotor hub 160.

The spindle motor 100 may include the hydrodynamic bearing assembly 200. The hydrodynamic bearing assembly 200 may include components forming bearing clearances filled with lubricating fluid.

That is, when the hydrodynamic bearing assembly 200 may include the sleeve housing 120, the sleeve 130, the shaft 140, the flange member 150, and the rotor hub 160 among the elements included in the spindle motor 100 so as to form the bearing clearances filled with the lubricating fluid.

In addition, the spindle motor 100 may be a motor installed in a record disk driving device for driving a record disk.

Here, terms with respect to directions will be defined. As viewed in FIG. 1, an axial direction refers to a vertical direction based on the shaft 140, and an outer diameter direction or an inner diameter direction refers to a horizontal direction, that is, a direction from an outer circumferential surface of the rotor hub 160 towards the shaft 140 or a direction from the shaft 140 towards the outer circumferential surface of the rotor hub 160.

In addition, a circumferential direction refers to a rotation direction along the outer circumferential surface of the rotor hub 160 or the shaft 140.

The base member 110 is a fixed member and includes a stator. Here, the stator may refer to any fixed member except for a rotating member and may include the base member 110, the sleeve housing 120, the sleeve 130, and the like.

The base member 110 may include an installation portion 112 in which the sleeve housing 120 is inserted and installed.

The installation portion 112 may protrude upwardly in the axial direction. In addition, an installation hole 112a may be formed in the installation portion 112 so as to insert and install the sleeve housing 120 therein.

An extension wall 112b may be formed in the installation portion 112 so as to constitute a labyrinth seal together with the rotor hub 160. In addition, a stator core 104 around which a coil 102 is wound may be installed on an outer circumferential surface of the extension wall 112b. The stator core 104 may be fixedly installed on the outer circumferential surface of the extension wall 112b via adhesives or press fitting.

The base member 110 may be formed of aluminum (Al) using die casting. In addition, the base member 110 may be molded by performing plastic working (e.g., a pressing process) on a steel sheet.

That is, the base member 110 may be formed of various materials using various processing methods and the present embodiment is not limited to the base member 110 described above.

The sleeve housing 120 is a fixed member that constitutes the stator together with the base member 110 and may be fixedly installed on the base member 110.

That is, the sleeve housing 120 may be inserted and fixedly installed in the installation portion 112. In other words, a lower end portion of an outer circumferential surface of the sleeve housing 120 may be adhered to an inner circumferential surface of the installation portion 112 using at least one method of an adhesive method, a welding method, and a press fitting method.

The sleeve 130 may be insertedly installed in the sleeve housing 120. To this end, the sleeve housing 120 may include a plate portion 122 having a circular plate shape and a cylindrical wall portion 124 that extends upwardly from an edge of the plate portion 122 in the axial direction.

That is, the sleeve housing 120 may have a cup shape of which an upper portion is open.

In addition, an upper end portion of an outer circumferential surface of the cylindrical wall portion 124 may be inclined in order to form a liquid vapor interface together with the rotor hub 160, which will be described below in more detail.

The sleeve 130 may be a fixed member that constitutes the stator together with the base member 110 and the sleeve housing 120 and may be fixedly installed in the sleeve housing 120. That is, an outer circumferential surface of the sleeve 130 may be adhered to and installed on an inner circumferential surface of the sleeve housing 120. In addition, the sleeve housing 120 and the sleeve 130 may be assembled via adhesives or press fitting.

In addition, a flange portion 131 may be formed on an upper end portion of the sleeve 130 so as to be coupled to an upper surface of the cylindrical wall portion 124 of the sleeve housing 120.

A shaft hole 132 may be formed in the sleeve 130 such that the shaft 140 may be insertedly disposed in the shaft hole 132. That is, the shaft 140 may be inserted into the shaft hole 132 such that an upper end portion of the shaft 140 may be disposed to protrude above the sleeve 130.

In addition, a communication groove 133 to provide a circulation path for the lubricating fluid is formed on the outer circumferential surface of the sleeve 130. In addition, a communication hole 134 may be formed in the sleeve 130 so as to connect the communication groove 133 and the shaft hole 132 formed in the sleeve 130 to each other.

The communication hole 134 may be formed in the diameter direction. In other words, the communication hole 134 may be formed to be horizontally disposed.

The communication groove 133 may include a first communication groove 133a that is formed in the axial direction and is connected to the communication hole 134, and a second communication groove 133b that is connected to the first communication groove 133a and is formed in the diameter direction.

In addition, the second communication groove 133b may be formed in a lower surface of the flange portion 131.

Upper and lower radial dynamic pressure grooves 135 and 136 having a herringbone pattern may be formed in an inner circumferential surface of the sleeve 130 so as to pump the lubricating fluid filled in the bearing clearance.

That is, the upper and lower radial dynamic pressure grooves 135 and 136 may be spaced apart from each other by a predetermined interval and the communication hole 134 may be formed between the upper and lower radial dynamic pressure grooves 135 and 136 in the sleeve 130.

During the rotation of the shaft 140, the upper and lower radial dynamic pressure grooves 135 and 136 may pump the lubricating fluid to generate a dynamic pressure. In this case, a relatively highest pressure may be generated at portions of the upper and lower radial dynamic pressure grooves 135 and 136 having a herringbone pattern, each of which corresponds to an apex.

In addition, the upper radial dynamic pressure groove 135 may have an upper portion with a smaller axial direction distance than an axial direction distance of a lower portion. That is, as shown in FIG. 3, when an axial direction distance from an upper end of the upper radial dynamic pressure groove 135 to the portion (which corresponds to the apex) at which a relatively highest pressure is generated is 'a' and an axial direction distance from a lower end of the upper radial dynamic pressure groove 135 to the highest pressure portion is 'b', the upper radial dynamic pressure groove 135 may be formed to satisfy a conditional expression b−a>0.

Thus, the lubricating fluid may move from a lower portion of the upper radial dynamic pressure groove 135 towards an upper portion thereof according to the rotation of the shaft 140.

In addition, the lower radial dynamic pressure groove 136 may have a lower portion having a smaller axial direction distance than an axial direction distance of an upper portion. That is, as shown in FIG. 3, when an axial direction distance from an upper end of the lower radial dynamic pressure groove 136 to a highest pressure portion (which corresponds to the apex) is 'c' and an axial direction distance from a lower end of the lower radial dynamic pressure groove 136 to the highest pressure portion is 'd', the lower radial dynamic pressure groove 136 may be formed to satisfy a conditional expression c−d>0.

Thus, the lubricating fluid may move from an upper portion of the lower radial dynamic pressure groove 136 towards a lower portion according to the rotation of the shaft 140.

In addition, the upper and lower radial dynamic pressure grooves 135 and 136 may be formed to satisfy a conditional expression a+b>c+d and to further satisfy a conditional expression b−a>c−d>0.

Thus, a phenomenon in which the lubricating fluid does not circulate during initial rotation of the shaft 140 may be reduced.

In addition, the upper and lower radial dynamic pressure grooves 135 and 136 are formed so as to satisfy the above conditional expressions, and thus, a distance (that is, a span length) between the highest pressure portions of the upper and lower radial dynamic pressure grooves 135 and 136 may be increased.

As a result, the shaft 140 may rotate stably. Furthermore, the highest pressure portion formed by the upper radial dynamic pressure groove 135 may be close to a center of gravity of a rotating member, thereby improving the rotational properties of the rotating member.

This will be described below in more detail.

According to the present embodiment, the case in which the upper and lower radial dynamic pressure grooves 135 and 136 are formed on the inner circumferential surface of the sleeve 130 is provided by way of an example. However, the present embodiment is not limited thereto. That is, the upper and lower radial dynamic pressure grooves 135 and 136 may be formed in an outer circumferential surface of the shaft 140.

In addition, the bearing clearance will be described below in more detail.

The bearing clearance refers to a clearance filled with the lubricating fluid. That is, the bearing clearance may include a clearance formed by the inner circumferential surface of the sleeve 130 and the outer circumferential surface of the shaft 140, a clearance formed by the sleeve 130 and the rotor hub 160, a clearance formed by the sleeve housing 120 and the rotor hub 160, a clearance formed by the sleeve housing 120 and the shaft 140, a clearance formed by the sleeve housing 120 and the flange member 150, and a clearance formed by the flange member 150 and the sleeve 130.

An interface (that is, a liquid vapor interface) between the lubricating fluid and air may be in the clearance formed by the sleeve housing 120 and the rotor hub 160.

According to the present embodiment, the spindle motor 100 is configured in such a manner that the bearing clearance is entirely filled with the lubricating fluid. This structure is referred to as a full-fill structure.

As shown in FIG. 4, the lubricating fluid filled with the bearing clearance may form two flows. That is, the lubricating fluid may move to have a first flow F1 formed by the upper radial dynamic pressure groove 135 and a second flow F2 formed by the lower radial dynamic pressure groove 136.

The shaft 140 may constitute a rotor as the rotating member. Here, the rotor is a rotating member that is rotatably supported by the stator.

The shaft 140 may be inserted into the shaft hole 132 of the sleeve 130 and rotate. That is, the shaft 140 may be rotatably supported by the sleeve 130. In addition, the shaft 140 may be disposed such that the upper end portion of the shaft 140 may protrude above the sleeve 130. The rotor hub 160 may be fixedly installed on the upper end portion of the shaft 140, which protrudes over the sleeve 130.

The flange member 150 is a rotating member that constitutes the rotor together with the shaft 140, is fixedly installed on the shaft 140 so as to be disposed below the sleeve 130, and may rotate together with the shaft 140. In addition, the flange member 150 may prevent the shaft 140 from separating from the sleeve 130 and may simultaneously prevent the shaft 140 from excessively moving upwards.

That is, the flange member 150 may prevent the shaft 140 from separating from the sleeve 130 due to an external shock. In addition, when the shaft 140 moves upwards by a predetermined height during the rotation of the shaft 140, the flange member 150 may prevent the shaft 140 from being excessively moved upward.

The rotor hub 160 may be the rotating member that constitutes the rotor together with the shaft 140 and the flange member 150 and may be fixedly installed on the upper end portion of the shaft 140. The rotor hub 160 may include a body 162 in which a mounting hole 162a into which the upper end portion of the shaft 140 is inserted is formed therein, a magnet mounting portion 164 that extends downwards from an edge of the body 162 in the axial direction, and a disk accommodation portion 166 that extends outwards from an end of the magnet mounting portion 164 in the diameter direction.

In addition, a driving magnet 164a is installed on an inner surface of the magnet mounting portion 164 and is disposed to face a front end of the stator core 104 around which the coil 102 is wound.

The driving magnet 164a may have an annular ring shape and may be a permanent magnet in which N and S poles are alternately magnetized in the circumferential direction so as to generate a magnetic force with predetermined intensity.

With regard to the rotation and driving of the rotor hub 160, power is supplied to the coil 102 wound around the stator core 104, and driving force allowing the rotor hub 160 to rotate is generated by electromagnetic interaction between the driving magnet 164a and the stator core 104 around which the coil 102 is wound.

Thus, the rotor hub 160 rotates. In addition, the shaft 140 on which the rotor hub 160 is fixedly installed may rotate together with the rotor hub 160 according to the rotation of the rotor hub 160.

A protrusion wall portion 168 that extends downwards in the axial direction may be formed on the body 162 so as to form an interface S1, that is, a liquid vapor interface S1 between the lubricating fluid and air together with the outer circumferential surface of the sleeve 130.

An inner surface of the protrusion wall portion 168 may face an upper end portion of the outer circumferential surface of the sleeve housing 120.

That is, the protrusion wall portion 168 may face the upper end portion of the outer circumferential surface of the cylindrical wall portion 124 of the sleeve housing 120, and the upper end portion of the outer circumferential surface of the cylindrical wall portion 124 is inclined, and thus, the liquid vapor interface S1 may be formed by capillary phenomenon.

As described above, the upper and lower radial dynamic pressure grooves 135 and 136 may be formed to satisfy the conditional expression a+b>c+d and to further satisfy the conditional expression b−a>c−d>0.

Thus, a phenomenon in which the lubricating fluid does not circulate during initial rotation of the shaft 140 (in addition, a flow of the lubricating fluid from the upper portion of the upper radial dynamic pressure groove 135 to the lower portion thereof) may be reduced.

In addition, the upper and lower radial dynamic pressure grooves 135 and 136 are formed so as to satisfy the above conditional expressions, and thus, a distance (that is, a span length) between the highest pressure portions of the upper and lower radial dynamic pressure grooves 135 and 136 may be increased.

As a result, the shaft 140 may rotate stably. Furthermore, the highest pressure portion formed by the upper radial dynamic pressure groove 135 may be close to a center of gravity of the rotor, thereby improving the rotational properties of the rotor.

The above operation will now be described in detail. First, the upper radial dynamic pressure groove 135 is disposed closer to the center of gravity of the rotor than the lower radial dynamic pressure groove 136. In addition, the upper and lower radial dynamic pressure grooves 135 and 136 may be formed to satisfy the conditional expression a+b>c+d such that the rotor may rotate stably. In other words, the axial direction distance of the upper radial dynamic pressure groove 135 may be greater than the axial direction distance of the lower radial dynamic pressure groove 136.

The upper radial dynamic pressure groove 135 may be formed to satisfy the conditional expression b−a>0 such that the lubricating fluid may move from the lower portion of the upper radial dynamic pressure groove 135 to the upper portion thereof. In addition, the lower radial dynamic pressure groove 136 may be formed to satisfy the conditional expression c−d>0 such that the lubricating fluid may flow from the upper portion of the lower radial dynamic pressure groove 136 to the lower portion thereof.

However, when the upper and lower radial dynamic pressure grooves 135 and 136 are formed to satisfy the conditional expression a+b>c+d>0, an interval of bearing clearance in which the upper radial dynamic pressure groove 135 is formed may be easily affected by process tolerance and/or assembly tolerance of components. That is, the interval of the bearing clearance is more easily affected by process tolerance and/or assembly tolerance of components at a portion corresponding to the upper radial dynamic pressure groove 135 than a portion corresponding to the lower radial dynamic pressure groove 136.

As set forth above, according to the embodiments of the present invention, the upper and lower radial dynamic pressure grooves formed to satisfy the conditional expressions a+b>c+d and b−a>c−d>0 may reduce a phenomenon in which lubricating fluid does not circulate, occurring at the time of initial rotation.

Since the upper and lower radial dynamic pressure grooves are formed to satisfy the conditional expressions described above, a distance (that is, a span length) between highest pressure portions of dynamic pressure generated by the upper and lower radial dynamic pressure grooves 135 and 136 may be increased.

As a result, the shaft may rotate stably. Furthermore, a highest pressure portion formed by the upper radial dynamic pressure groove may be close to a center of gravity of the rotor, thereby improving the rotational properties of the rotor.

While the present invention has been shown and described in connection with the embodiments, it will be apparent to those skilled in the art that modifications and variations can be made without departing from the spirit and scope of the invention as defined by the appended claims.

What is claimed is:

1. A hydrodynamic bearing assembly, comprising:
   a sleeve including a shaft hole formed therein; and
   a shaft rotatably inserted into the shaft hole, the shaft constituting, together with the sleeve, a bearing clearance filled with lubricating fluid,
   wherein at least one of an inner circumferential surface of the sleeve and an outer circumferential surface of the shaft includes upper and lower radial dynamic pressure grooves having a herringbone pattern formed therein so as to pump the lubricating fluid filled in the bearing clearance, and
   when an axial direction distance from an upper end of the upper radial dynamic pressure groove to a highest pressure portion is 'a', an axial direction distance from a lower end of the upper radial dynamic pressure groove to the highest pressure portion is 'b', an axial direction distance from an upper end of the lower radial dynamic pressure groove to a highest pressure portion is 'c', and an axial direction distance from a lower end of the lower radial dynamic pressure groove to the highest pressure portion is 'd', conditional expressions a+b>c+d and b−a>c−d>0 are satisfied.

2. The hydrodynamic bearing assembly of claim 1, further comprising a sleeve housing including the sleeve inserted thereinto.

3. The hydrodynamic bearing assembly of claim 2, further comprising:
a communication groove formed on the outer circumferential surface of the sleeve to provide a circulation path for the lubricating fluid; and
a communication hole formed in the sleeve to connect the communication groove and the shaft hole in the sleeve.

4. The hydrodynamic bearing assembly of claim 3, wherein the communication groove includes a first communication groove formed in an axial direction and connected to the communication hole, and a second communication groove connected to the first communication groove and formed in a diameter direction.

5. The hydrodynamic bearing assembly of claim 2, wherein the sleeve housing includes a plate portion having a circular plate shape and a cylindrical wall portion extending from the plate portion in an axial direction.

6. The hydrodynamic bearing assembly of claim 5, further comprising a flange portion formed at an upper end portion of the sleeve and coupled to an upper surface of the cylindrical wall portion.

7. The hydrodynamic bearing assembly of claim 5, further comprising a rotor hub fixedly installed on an upper end portion of the shaft and including a protrusion wall portion protruding to form a liquid vapor interface together with the cylindrical wall portion,
wherein the cylindrical wall portion has an outer circumferential surface having an upper end portion inclined towards the protrusion wall portion.

8. The hydrodynamic bearing assembly of claim 1, further comprising a flange member fixedly installed on the shaft to be disposed below the sleeve and rotating together with the shaft.

9. A spindle motor, comprising:
a base member including an installation portion protruding in an axial direction;
a sleeve housing fixedly installed on an inner surface of the installation portion;
a sleeve inserted and fixeldy installed in the sleeve housing and including a shaft hole formed therein;
a shaft rotatably inserted into the shaft hole;
a flange member fixedly installed on the shaft to be disposed below the sleeve and rotating together with the shaft; and
a rotor hub fixedly installed on an upper end portion of the shaft and including a protrusion wall portion protruding to form a liquid vapor interface together with an outer circumferential surface of the sleeve housing,
wherein at least one of an inner circumferential surface of the sleeve and an outer circumferential surface of the shaft includes upper and lower radial dynamic pressure grooves having a herringbone pattern formed therein so as to pump lubricating fluid filled in the bearing clearance, and
when an axial direction distance from an upper end of the upper radial dynamic pressure groove to a highest pressure portion is 'a', an axial direction distance from a lower end of the upper radial dynamic pressure groove to the highest pressure portion is 'b', an axial direction distance from an upper end of the lower radial dynamic pressure groove to a highest pressure portion is 'c', and an axial direction distance from a lower end of the lower radial dynamic pressure groove to the highest pressure portion is 'd', conditional expressions $a+b>c+d$ and $b-a>c-d>0$ are satisfied.

10. The spindle motor of claim 9, wherein the sleeve includes a communication groove formed on the outer circumferential surface thereof to provide a circulation path for the lubricating fluid; and a communication hole formed therein to connect the communication groove and the shaft hole in the sleeve.

11. The spindle motor of claim 10, wherein the communication groove includes a first communication groove formed in an axial direction and connected to the communication hole, and a second communication groove connected to the first communication groove and formed in a diameter direction.

12. The spindle motor of claim 11, wherein the sleeve housing includes a plate portion having a circular plate shape and a cylindrical wall portion extending from the plate portion in an axial direction, the sleeve includes a flange portion formed on an upper end portion thereof and coupled to an upper surface of the cylindrical wall portion, and the second communication groove is formed on a lower surface of the flange portion.

* * * * *